United States Patent
Bellows et al.

(10) Patent No.: US 7,305,517 B2
(45) Date of Patent: Dec. 4, 2007

(54) STRUCTURE OF SEQUENCERS THAT PERFORM INITIAL AND PERIODIC CALIBRATIONS IN A MEMORY SYSTEM

(75) Inventors: Mark David Bellows, Rochester, MN (US); Ryan Abel Heckendorf, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 10/988,290

(22) Filed: Nov. 12, 2004

(65) Prior Publication Data

US 2006/0106975 A1 May 18, 2006

(51) Int. Cl.
*G06F 13/00* (2006.01)

(52) U.S. Cl. .......................... 711/105; 711/5; 711/106; 365/230.03

(58) Field of Classification Search ...................... None
See application file for complete search history.

(56) References Cited

U.S. PATENT DOCUMENTS

| | | | |
|---|---|---|---|
| 6,310,814 B1 * | 10/2001 | Hampel et al. ............. 365/222 |
| 6,493,836 B2 * | 12/2002 | Olarig et al. ................. 714/42 |
| 6,628,216 B2 * | 9/2003 | Chen et al. .................. 341/120 |
| 6,631,440 B2 * | 10/2003 | Jenne et al. ................ 711/105 |
| 6,714,886 B2 * | 3/2004 | Sung et al. ................. 702/107 |
| 6,836,831 B2 * | 12/2004 | Borkenhagen et al. ...... 711/169 |
| 6,842,393 B2 * | 1/2005 | Ryan et al. ............ 365/230.03 |

* cited by examiner

*Primary Examiner*—Jasmine Song
(74) *Attorney, Agent, or Firm*—Stephen R. Tkacs; Stephen J. Walder, Jr.; D'Ann N. Rifai

(57) ABSTRACT

A structure of sequencers, a method, and a computer program are provided for performing initial and periodic calibrations in an XDR™ memory system. A memory controller that performs these calibrations is divided into identical, independent halves, with each half containing a Current/Impedance Calibration (i/z Cal) sequencer and six Bank sequencers. The i/z Cal sequencer contains three pathways that perform the XIO current and termination calibrations, and the XDR™ DRAM current and termination impedance calibrations. Each Bank sequencer contains normal read and write operation pathways that are reused to accomplish receive setup, receive hold, transmit setup, transmit hold, XIO receive, and XIO transmit timing calibrations. Initial and periodic calibrations are necessary to ensure the precise transfer of data between the XIOs and the XDR™ DRAMs.

17 Claims, 6 Drawing Sheets

STRUCTURE OF SEQUENCERS THAT PERFORM INITIAL AND PERIODIC CALIBRATIONS IN A MEMORY SYSTEM

FIELD OF THE INVENTION

The present invention relates generally to the structure of sequencers within a memory controller that perform initial and periodic calibrations in an XDR™ memory system.

DESCRIPTION OF THE RELATED ART

An Extreme Data Rate (XDR™) memory system includes three primary semiconductor components: a memory controller, at least one XDR™ IO Cell (XIO), and XDR™ DRAMs. With XDR™, available from Rambus, Inc., 4440 El Camino Real, Los Altos, Calif. 94022, the data transfer rate to and from memory has been dramatically increased. Along with the dramatic increase in data transfer rate, new technology was needed to transfer the data precisely. Rambus innovated FlexPhase™ technology to help accomplish this. FlexPhase™ skewing/de-skewing circuitry in the XIO eliminates the need for PCB trace length matching and strict PCB timing constraints.

Along with this technology, a method to do real-time calibrations on-chip was needed to ensure the precise transmission of data. There are two classes of calibrations: initial and periodic. These calibrations are accomplished by the XIO in conjunction with the memory controller. Initial calibrations are performed right after the XDR™ memory system is powered on (or when exiting Powerdown mode), and are required to set timing, current, and termination values to their initial points. Periodic calibrations are performed in between sequences of normal memory read and write operations. These calibrations adjust timing, current, and termination values to optimal points to compensate for changing system conditions. Periodic calibrations are necessary to keep the XDR™ memory system operating precisely and efficiently.

The memory controller transmits to the XIO the commands and data that accomplish these calibrations. Some calibrations are used to calibrate the XIO and some are used to calibrate the XDR™ DRAMs. There are six calibration pattern types: Pattern Types 0, 1, 2, 3, 6, and 7. Pattern Type 0 accomplishes the XIO current calibration and the XIO termination calibration. Pattern Type 1 accomplishes the XDR™ DRAM termination impedance calibration. Pattern Type 2 accomplishes the XDR™ DRAM current calibration. These three calibration types are non-timing, which means that they only affect current and termination values. On the other hand, timing calibrations affect the XIO phase settings for the data pins.

Pattern Type 3 accomplishes receive setup, receive hold, transmit setup, and transmit hold timing calibrations. Pattern Type 6 accomplishes the receive timing calibration, which calibrates the data pin phases involved with read operations. Pattern Type 7 accomplishes the transmit timing calibration, which calibrates the data pin phases involved with write operations. These calibrations are timing calibrations, and therefore ensure the precise and efficient transfer of data. All six of the calibration types fall into the "initial" class. Pattern Types 0, 1, 2, and 3 also fall into the "periodic" class.

SUMMARY OF THE INVENTION

The present invention provides a structure of sequencers, a method, and a computer program for performing initial and periodic calibrations in an XDR™ memory system. The XDR™ memory system being considered contains three primary semiconductor components: a memory controller, two XIOs, and XDR™ DRAMs. The memory controller is divided into two identical halves with each half controlling an XIO. An XIO sits between the memory controller and the XDR™ DRAMs, and is on the same chip as the memory controller. Initial and periodic calibrations must be executed to ensure the precise transmission of data from the memory controller to the XDR™ DRAMs and back. To handle these initial and periodic calibrations each memory controller half contains one Current/Impedance Calibration (i/z Cal) sequencer and six Bank sequencers.

The i/z Cal sequencer and each Bank sequencer contain three pathways. The i/z Cal sequencer contains one pathway (Pattern Type 0) to perform the XIO current and termination calibrations, one pathway (Pattern Type 1) to perform the XDR™ DRAM termination impedance calibrations, and one pathway (Pattern Type 2) to perform the XDR™ DRAM current calibrations. Each Bank sequencer contains a read path, a write path, and a refresh path that carry out normal read, write, and refresh operations, respectively. Three unique pathways accomplish timing calibrations by reusing the read and write paths of the Bank sequencers. One pathway (Pattern Type 3) performs the receive setup, receive hold, transmit setup, and transmit hold timing calibrations by using the write path of one Bank sequencer and then the read path of a different Bank sequencer. Another pathway (Pattern Type 6) performs the receive timing calibration by using the read paths of the Bank sequencers. The last pathway (Pattern Type 7) performs the transmit timing calibration by using the write paths of the Bank sequencers and then the read paths of the Bank sequencers.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in flow diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

The design of this XDR™ memory system involves one memory controller with two identical, independent halves. Since there are two identical memory controller halves, there are two identical XIOs. Each XIO is connected to XDR™ DRAMs by a memory channel. Each half of the memory controller contains one Current/Impedance Calibration sequencer (i/z Cal sequencer) and six Bank sequencers. To start and keep the XIOs and XDR™ DRAMs running optimally, initial and periodic calibrations must be carried out. These calibrations are initiated by the XIO through register writes or timers within the XIO. The memory controller responds to such requests by sourcing calibration commands and data (when required). A pattern enable (PAT_ENA)/pattern marker (PAT_MRKR) handshake is used. Each calibration begins when the PAT_ENA signal from the XIO is asserted, along with the Pattern Type indication. Subsequently, after all of the Bank sequencers return to idle, the memory controller asserts the PAT_MRKR to indicate that the normal memory operations (reads, writes, and refreshes) have ceased, and performs the requested calibration. After the calibration is finished, the memory controller negates the PAT_MRKR signal. Subsequently, the XIO negates the PAT_ENA signal, and normal memory operations resume.

Figure 1:
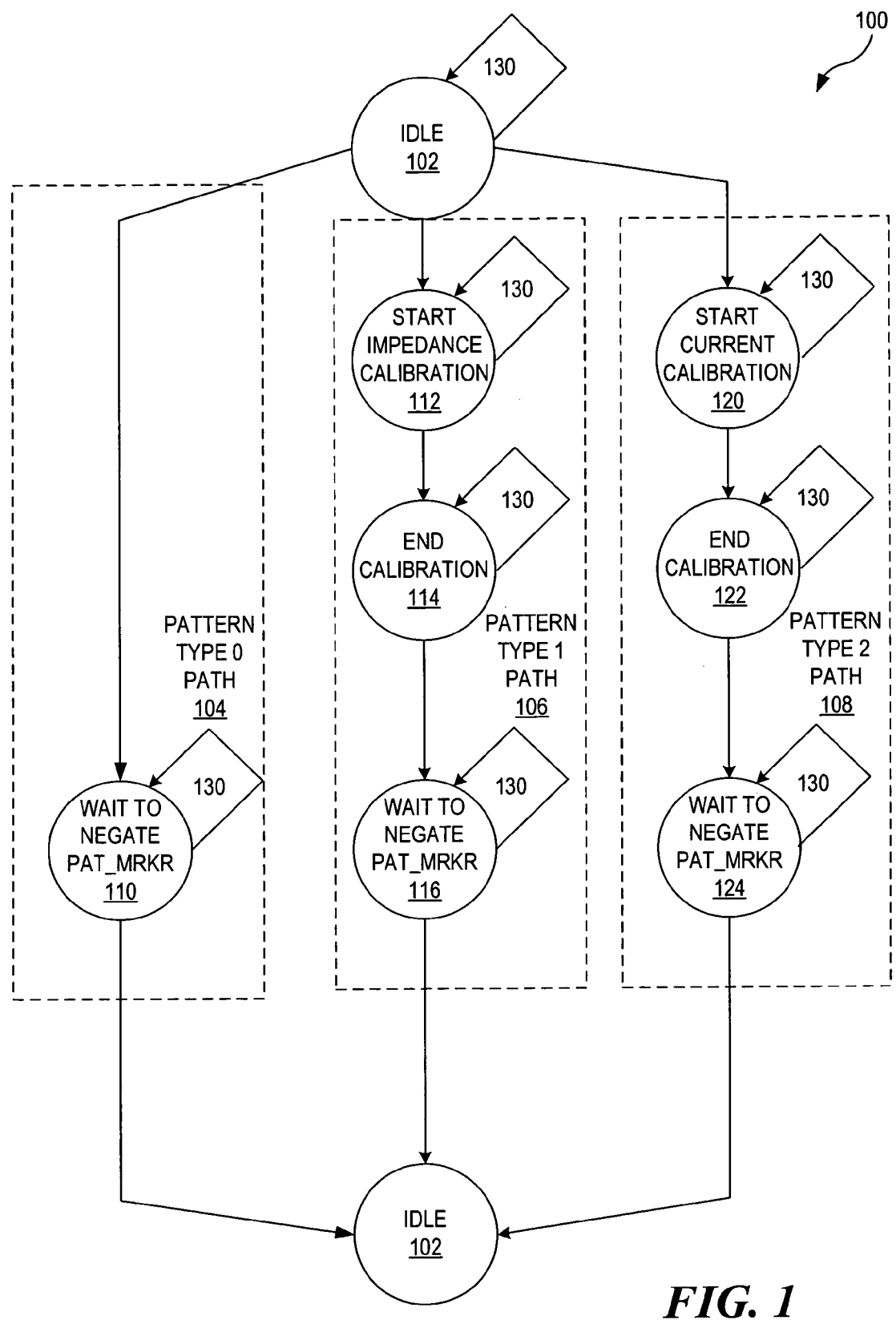
FIG. 1 is a state transition diagram illustrating the pathways through a Current/Impedence Calibration sequencer (i/z Cal sequencer) that perform Pattern Types 0, 1, and 2.

Referring to FIG. 1 of the drawings, reference numeral 100 depicts a state transition diagram illustrating the pathways through an i/z Cal sequencer that perform Pattern Types 0, 1, and 2. The i/z Cal sequencer has one counter that controls the delays for the state transitions on the pathways. Pattern Type 0 path 104 performs the XIO initial and periodic current calibrations and the XIO initial and periodic termination calibrations. The process begins with the i/z Cal sequencer Idle 102. When the PAT_ENA and PAT_MRKR signals have both been asserted, the i/z Cal sequencer advances to Wait to Negate PAT_MRKR state 110. The arrow 130 on the Wait to Negate PAT_MRKR step 110 illustrates a delay before negating PAT_MRKR and advancing to idle 102. The same path traversal applies to both an XIO current calibration and an XIO termination calibration. These two calibrations ensure that the XIO is operating at the optimal current and termination settings. No data is provided to the XIO for Pattern Type 0. The delay 130 is generally of a different duration for every state depending on the XIO timing parameters (which are conveyed to the memory controller via configuration registers).

Referring again to FIG. 1, Pattern Type 1 path 106 performs the XDR™ DRAM initial and periodic termination impedance calibrations. The process begins with the i/z Cal sequencer in an idle state 102. When the Pattern Type 1 operation begins, the sequence advances to the Start Impedance Calibration state 112. After waiting a while (130), the sequencer issues a Start Impedance Calibration command on the QDATA bus to the XIO, and advances to End Calibration 114. Regarding QDATA, the XIO relays the commands on QDATA to the XDR™ DRAMs via the RQ bus, which is part of a memory channel. After waiting a while (130), the sequencer issues an End Calibration command on QDATA and advances to Wait to Negate PAT_MRKR 116. After waiting some more (130), the sequencer negates PAT_MRKR and advances to idle 102. No data is provided to the XIO for Pattern Type 1.

Referring again to FIG. 1, Pattern Type 2 path 108 performs the XDR™ DRAM initial and periodic current calibrations. The process begins with the i/z Cal sequencer in an idle state 102. When the Pattern Type 2 operation begins, the sequence advances to the Start Current Calibration step 120. After waiting a while (130), the sequencer issues a Start Current Calibration command on the QDATA bus to the XIO, and advances to End Calibration 122. After waiting a while (130), the sequencer issues an End Calibration command on QDATA and advances to Wait to Negate PAT_MRKR 124. After waiting some more (130), the sequencer negates PAT_MRKR and advances to idle 102. No data is provided to the XIO for Pattern Type 2.

In each memory controller half there are six Bank sequencers that accomplish normal read, write and refresh operations, as well as the Pattern Types 3, 6, and 7. Once again, Pattern Types 3, 6, and 7 are the timing calibrations. Six Bank sequencers were selected per memory controller half based on the DRAM row cycle time and the tRR timing parameter. The row cycle time can be thought of as the time it takes a Bank sequencer to get back around to idle once it advances from the idle state. Under normal conditions, six bank sequencers is enough such that even when they get going in parallel as fast as possible (one can be started every four clock cycles), there is always at least one available (in the idle state) for the next operation. This helps to avoid stalling between normal operations. Also, the Bank sequencers are not dedicated to particular DRAM banks; each is assigned to a bank upon starting up.

Figure 2:
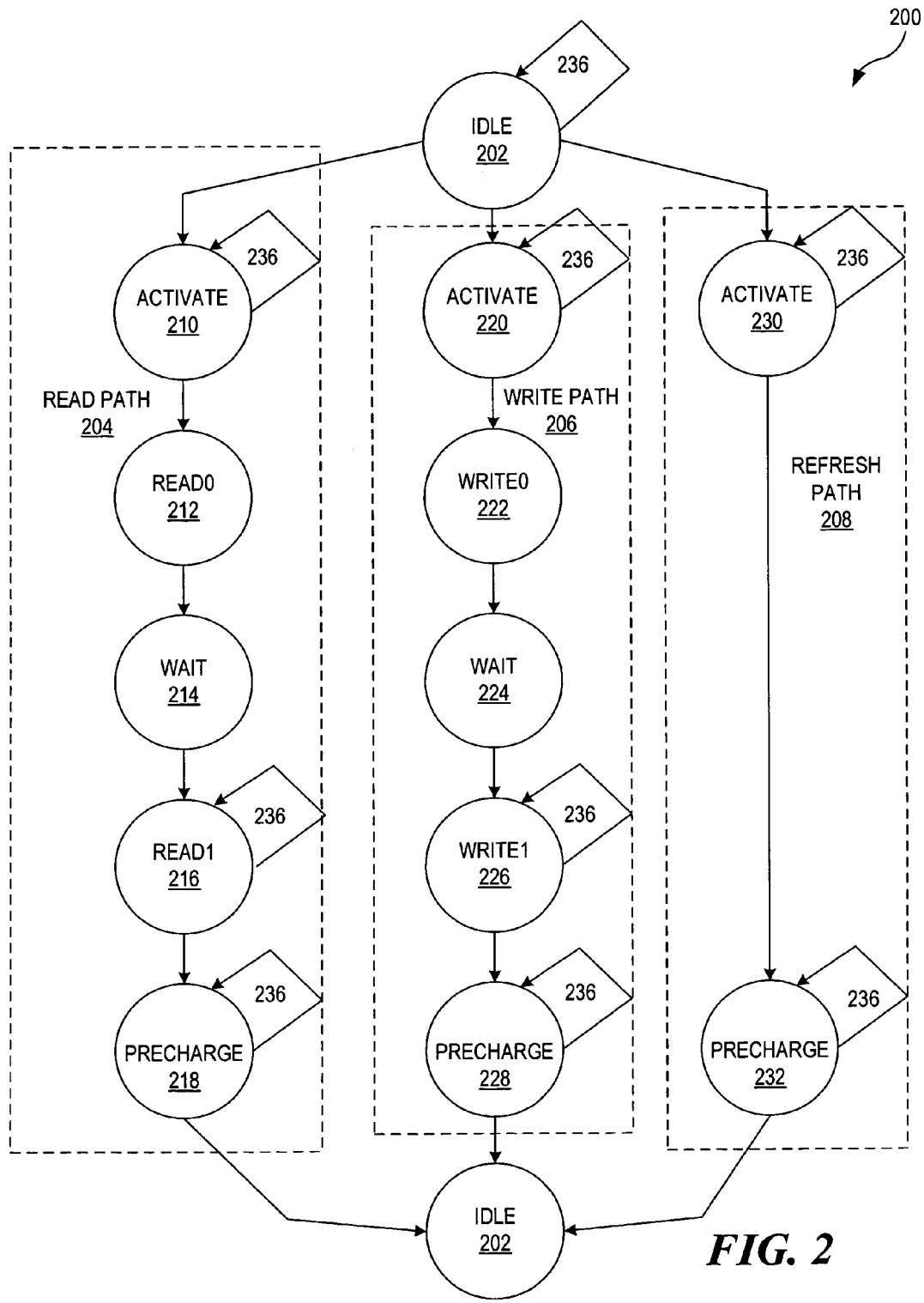
FIG. 2 is a state transition diagram illustrating the pathways through a Bank sequencer that perform normal operations (reads, writes, and refreshes) as well as Pattern Types 3, 6, and 7.

Each Bank sequencer contains three counters to control the timing of the DRAM commands that make up read, write and refresh operations. The read path 204, the write path 206, and the refresh path 208 are shown in FIG. 2. At the beginning of an operation, the counters are loaded. One counter determines the delay between the activate command and the first column command. This counter is not used for the refresh path. A second counter determines the delay between the activate command and the precharge command. A third counter determines the delay between the activate command and getting back around to the idle state.

Referring to FIG. 2 of the drawings, reference numeral 200 is a state transition diagram illustrating the pathways through a Bank sequencer that perform normal operations (read, writes, and refreshes) as well as Pattern Types 3, 6, and 7. A read operation is accomplished by read path 204. A read operation consists of a row activate command, column read commands (one column read command if burst length is 32 and two if burst length is 16), and a row precharge command. Be aware that this entire discussion assumes the burst length is 16 unless otherwise specified. When started, a Bank sequencer issues a row activate command on QDATA and advances to Activate 210. As shown by the arrow 236, there is a delay before issuing a column read command and advancing to Read0 212. As before, be aware that the delay 236 is generally of a different duration for every state, depending on XDR™ DRAM timing parameters (which are conveyed to the memory controller via configuration registers). From Read0 212 the sequencer advances to Wait 214 automatically, and then issues a second column read command and advances to Read1 216. After some delay (236), a row precharge command is issued and the sequencer advances to Precharge 218. After some delay (236), the sequencer returns to idle 202. Traversing this pathway generates a pulse that goes down a configurable delay line and ultimately indicates to the dataflow partition that read data from the XIO should be captured (sampled).

The write path 206 is similar to the read path 204, but it handles the write operations. A write operation consists of a row activate command, column write commands (one column write command if burst length is 32 and two if burst length is 16), and a row precharge command. When started, a Bank sequencer issues a row activate command on QDATA and advances to Activate 220. As shown by the arrow 236, there is a delay before issuing a column write command and advancing to Write0 222. From Write0 222 the sequencer advances to Wait 224 automatically, and then issues a second column write command and advances to Write1 226. After some delay (236), a row precharge command is issued and the sequencer advances to Precharge 228. After some delay (236), the sequencer returns to idle 202. Traversing this pathway generates a pulse that goes down a configurable delay line and ultimately indicates to the dataflow partition that write data should be launched (sent to the XIO).

Each bank sequencer also has a refresh path 208. This refresh path 208 is used to refresh the data located in the XDR™ DRAMs. When initiated, a Bank sequencer issues a row activate command on QDATA and advances to Activate 230. As shown by the arrow 236, there is a delay before issuing a row precharge command and advancing to Precharge 232. After some delay (236), the sequencer returns to idle 202.

Pattern Type 3 is used to accomplish receive setup initial and periodic timing calibrations, receive hold initial and periodic timing calibrations, transmit setup initial and periodic timing calibrations, and transmit hold initial and periodic timing calibrations. All of these are timing calibrations that follow the same pathway (Pattern Type 3) in the Bank sequencers. The Bank sequencers effectively drive the commands on QDATA. They also signal to the dataflow partition when to provide data (both write and Expects) to the XIO for the Pattern Type 3 calibrations. The write data, the Expects data, and the address for Pattern Type 3 calibrations come from registers that are set up ahead of time. One or two cache lines of main memory store these calibration patterns. The number of cache lines to store the patterns depends upon the number of XIOs in the system (one cache line for one XIO and two cache lines for two XIOs). These calibration patterns must be stored in the "memory hole", which is an area of memory that is not scrubbed. Not scrubbing the patterns is necessary because they cover the ECC pins as well, but do not have valid ECC bits in them. If they were scrubbed, false single-bit errors or false double-bit errors may be detected and detrimental actions (such as flipping bits or causing an interrupt) would subsequently occur.

Figure 3:
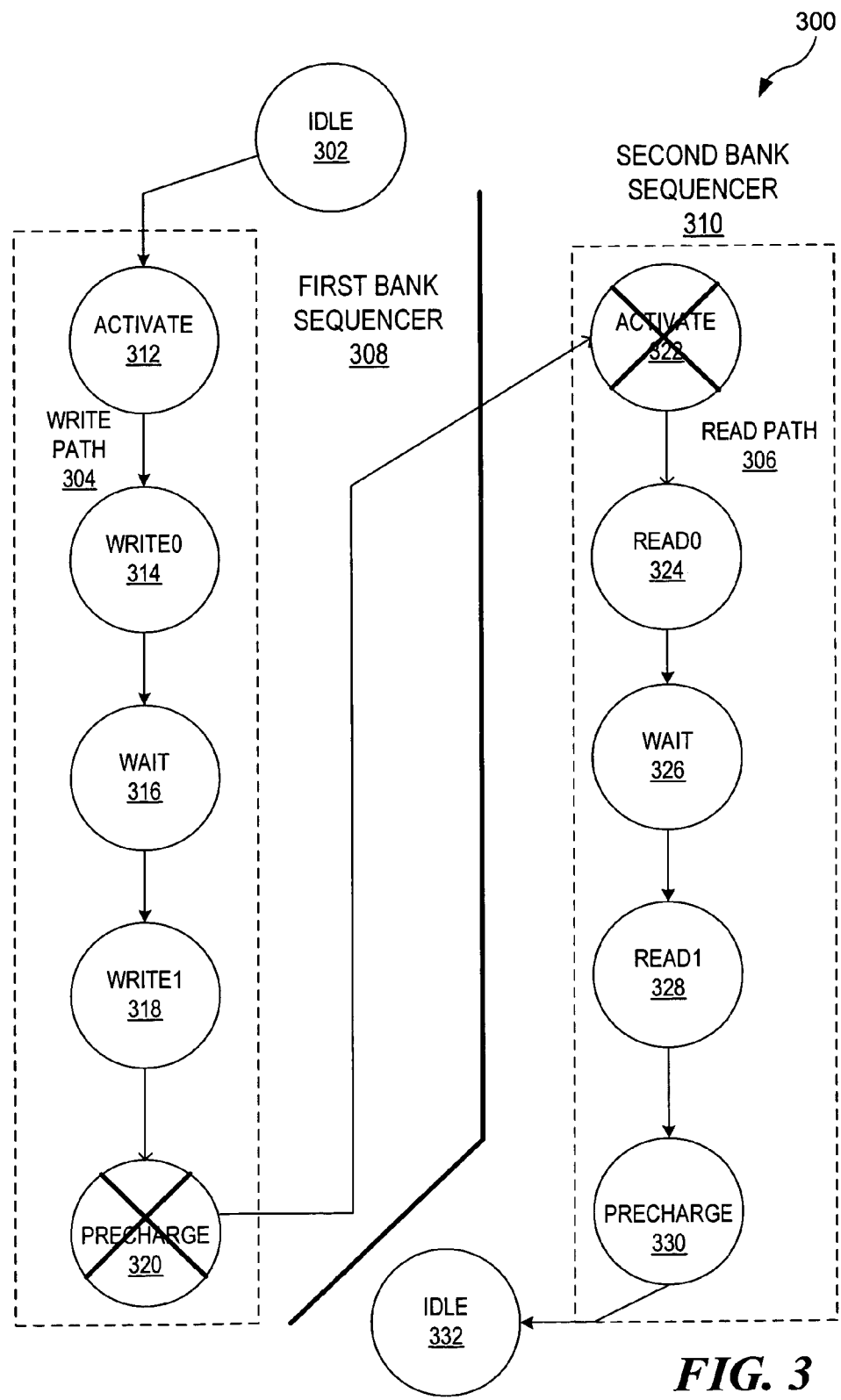
FIG. 3 is a state transition diagram illustrating the pathway of a Pattern Type 3 through two Bank sequencers.

Referring to FIG. 3 of the drawings, reference numeral 300 is a state transition diagram illustrating the pathway for Pattern Type 3. Two separate Bank sequencers are used to accomplish each Pattern Type 3 calibration. Before the calibration process begins both Bank sequencers 308 and 310 are idle 302 and 332, respectively. The write (304) and read paths (306) correspond to the write (206) and read paths (204) in FIG. 2. The process begins with a write operation that goes down the write path 304 of the first bank sequencer 308. The states include Activate 312, Write0 314, Wait 316, and Write1 318. For the write operation, write data is provided to the XIO in the usual manner, except that it is sourced by a register.

After the write operation, a "Read with Expects Data" operation is carried out on a second Bank sequencer 310. A "Read with Expects Data" operation can be described as a trip down the read path 306, but the data side of the operation is handled like a write operation in that Expects data, which is just like write data to the memory controller, is provided to the XIO using the same data register. After the Write1 state 318 on the first bank sequencer 308, Pattern Type 3 uses a second bank sequencer and begins with the Read0 state 324. Control logic determines the appropriate times to start the two Bank sequencers relative to one another to accomplish a Pattern Type 3. Technically, the Bank sequencers step through the Precharge 320 and Activate 322 states, but the usual DRAM commands associated with these states are blocked. Subsequent to the Read0 state 324, a Pattern Type 3 travels down the read path 306 to Wait 326, Read1 328, and Precharge 330. Once again, this is a "Read with Expects Data" sequence that is the same as the normal read sequence, but it provides Expects data to the XIO. Lastly, the second bank sequencer goes idle 332. Activate 312, then Write0 314, then Write1 318, then Read0 324, then Read1 328, and finally Precharge 330 is the sequence of commands driven on QDATA. As previously described, the XIO subsequently relays the commands on QDATA to the XDR™ DRAMs via the RQ bus, which is part of a memory channel.

Figure 4:
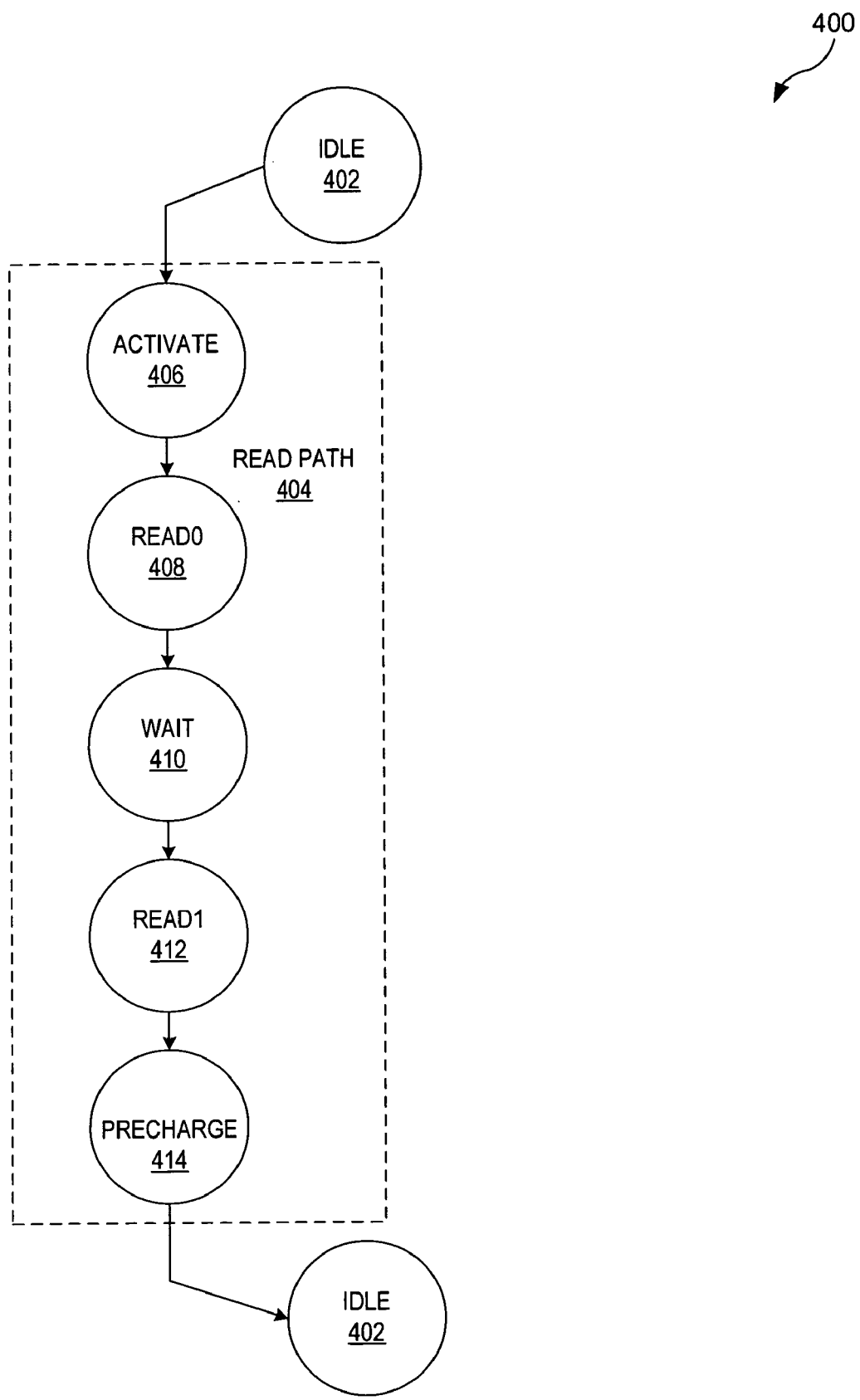
FIG. 4 is a state transition diagram illustrating the Bank sequencer pathway used as part of a Pattern Type 6.

Referring to FIG. 4 of the drawings, reference numeral 400 illustrates the pathway of Pattern Type 6. Pattern Type 6 performs the XIO initial receive timing calibration. This calibration is only used during initialization and Powerdown exit. Writes from the command queues are turned into "Reads with Expects Data". The command queues (address and data) are revalidated at the beginning of each PAT_ENA/PAT_MRKR handshake. Each command in the queue is a cache-line operation. Two to 32 cache lines are delivered to the XIO for each PAT_ENA/PAT_MRKR handshake. There is one PAT_ENA/PAT_MRKR handshake for each phase setting (there are 256 phase settings in this embodiment). N times as many PAT_ENA/PAT_MRKR handshakes occur per phase setting when oversampling is used (N can be a large number like 16,000). The bottom line is that this type of calibration is done over and over again. A Pattern Type 6 calibration uses the read path 404 of the Bank sequencers, which corresponds to read path 204 in FIG. 2. To accomplish the 2 to 32 cache-line operations, Bank sequencers are employed in the normal fashion. The read path 404 is traversed 2 to 32 times during a Pattern Type 6. Before the calibration begins, the bank sequencer is idle 402. When the Pattern Type 6 calibration begins, the first Bank sequencer to handle the first cache-line operation travels down the read path 404. The states consist of Activate 406, Read0 408, Wait 410, Read1 412, and Precharge 414. After each cache-line operation of a Pattern Type 6 calibration is completed, the bank sequencer returns to idle 402. Overall, this calibration is carried out just like a normal read operation except that Expects data is provided with the reads. Once again, the Expects data is transmitted to the XIO in the same way that write data normally is.

A prerequisite to executing Pattern Type 6 calibrations is that data (which is the same as Expects data) be loaded into holding buffers in the XDR™ DRAMs via the serial bus (which is part of the memory channel), and committed to the DRAM cores using Activate-Write-Precharge DRAM command sequences. Rambus calls this step Write Data Serial Load (WDSL). The Bank sequencers perform this special sequence as well, using the Write Path 206. Note that this is the same DRAM command sequence as when doing a write operation with a burst length of 32. The XDR™ DRAM holding buffers can only hold one column-command worth of data; once these are full, the processor kicks off a normal write operation to commit the data. The memory controller executes this as usual, using a Bank sequencer. There is one exception: an additional address bit (which comes from a memory controller configuration register) is ORed in when the burst length is 16, since the data quantity in this case is one half of the usual amount. Also, the memory controller provides garbage write data in this case, which the XDR™ DRAMs throw away since they have data in their holding buffers. This serial loading enables subsequent (Pattern Type 6) receive timing calibrations, where the XIO can compare read data versus Expects data to see if the data links are functioning correctly in the receive direction.

Figure 5:
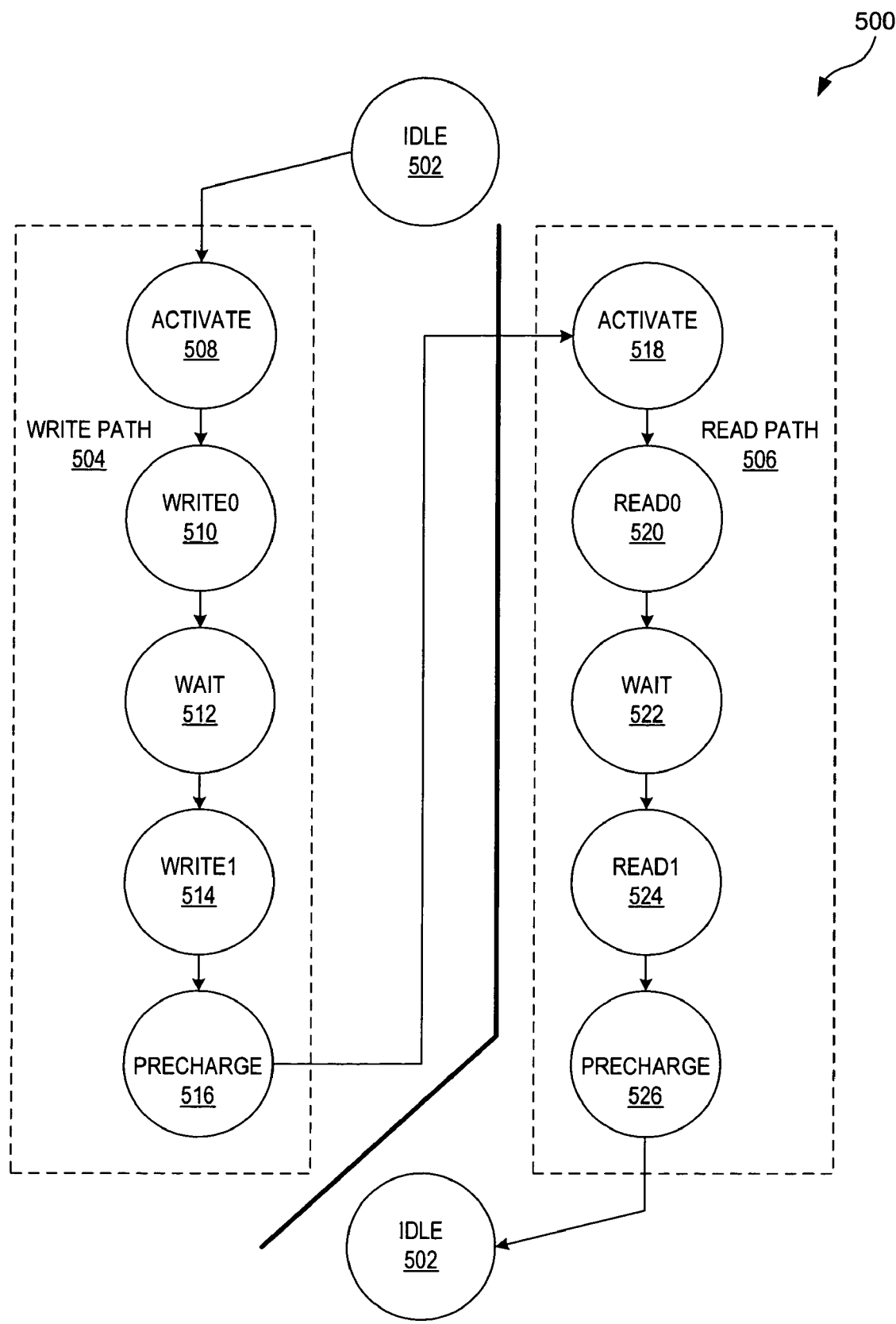
FIG. 5 is a state transition diagram illustrating the Bank sequencer pathway used as part of a Pattern Type 7.

Referring to FIG. 5 of the drawings, reference numeral 500 illustrates the pathway of Pattern Type 7. Pattern Type 7 performs the XIO initial transmit timing calibration. This calibration is only used during initialization and Powerdown exit. Writes from the command queues (address and data) use the write path 504. The command queues are revalidated at the beginning and in the middle of each PAT_ENA/PAT_MRKR handshake for a Pattern Type 7. Before this calibration begins, all of the Bank sequencers are idle 502. The first Bank sequencer starts down the write path 504, which corresponds to write path 206 in FIG. 2. The states of the write path 504 consist of Activate 508, Write0 510, Wait 512, Write1 514, and Precharge 516. After the Bank sequencers accomplish all the writes, the command queues are revalidated and the writes from the command queues are turned into "Reads with Expects Data". All of the writes are accomplished before the reads are initiated. Subsequently, the read path 506 of the Bank sequencers is used, which corresponds to read path 204 in FIG. 2. The states of the read path 506 consist of Activate 518, Read0 520, Wait 522, Read1 524 and Precharge 526. All six Bank sequencers become idle as the burst of writes concludes, and as the burst of "Reads with Expects" concludes.

Two to 32 times 2 cache lines are delivered to the XIO for each PAT_ENA/PAT_MRKR handshake. There is one PAT_ENA/PAT_MRKR handshake for each phase setting. N times as many PAT_ENA/PAT_MRKR handshakes occur per phase setting when oversampling is used, where N can be a large number like 16,000. The bottom line is that this type of calibration is done over and over again. For Pattern Type 7, the write path 504 is traversed 2 to 32 times and the read path 506 is traversed 2 to 32 times. Since all the writes are executed first, the transition from the write path 504 to the read path 506 occurs only once.

Overall, these current, termination, and timing calibrations are needed to keep the XDR™ memory system running at optimal precision and efficiency. Once again, the same calibration process is used for each memory controller half/XIO combo in this XDR™ memory system.

Figure 6:
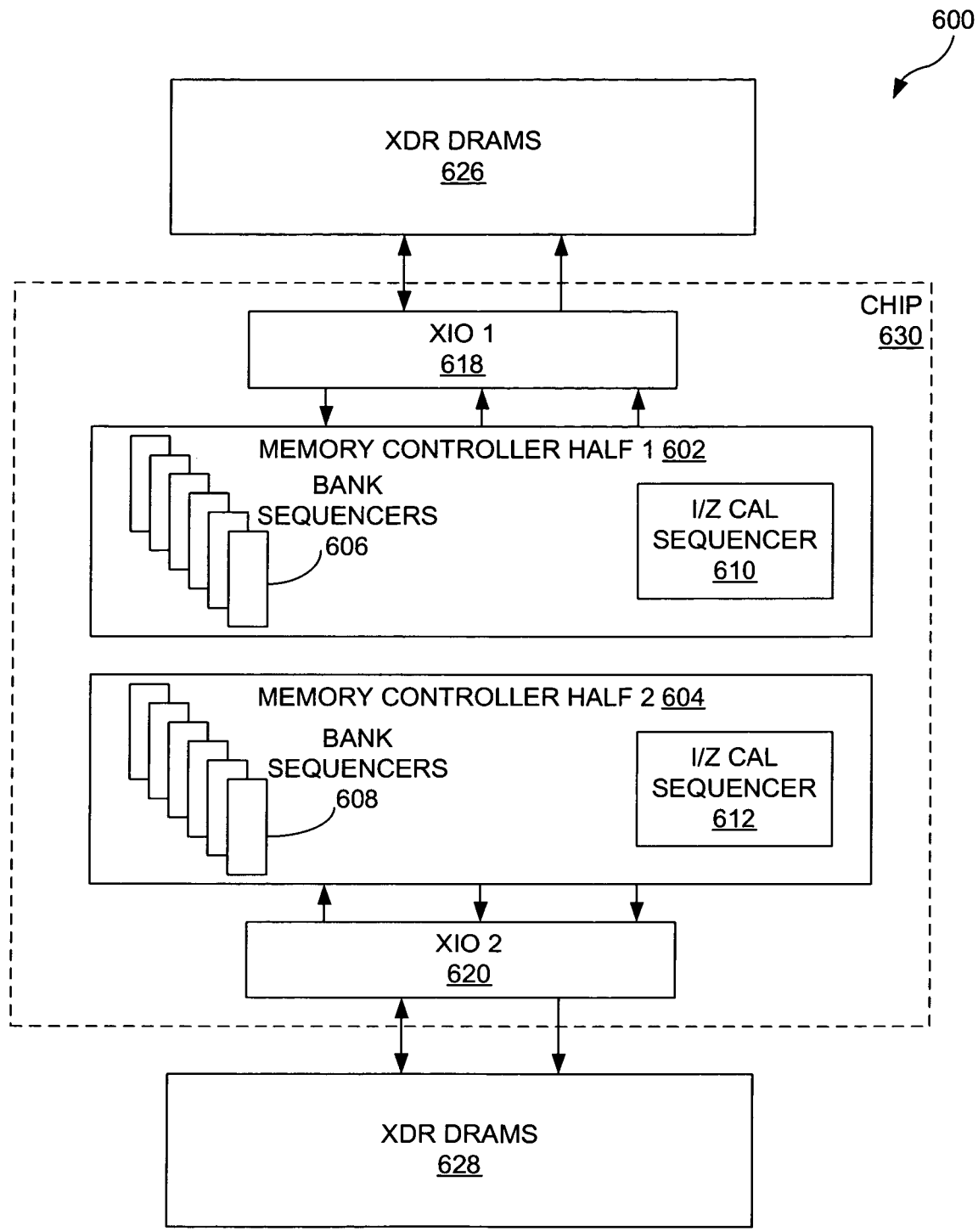
FIG. 6 is a block diagram illustrating the configuration of the XDR™ memory system that performs initial and periodic calibrations.

Referring to FIG. 6 of the drawings, reference numeral 600 generally indicates a block diagram illustrating the configuration of the XDR™ memory system that performs initial and periodic calibrations. Memory controller half 1 602 and memory controller half 2 604 are identical, and perform the initial and periodic calibrations needed by XIOs 618 and 620 and XDR™ DRAMs 626 and 628. Memory controller half 1 602 contains one i/z Cal sequencer 610 and six Bank sequencers 606. Memory controller half 2 604 also contains one i/z Cal sequencer 612 and six Bank sequencers 608. Memory controller half 1 602 is connected to XIO 1 618, and XIO 1 618 is connected to XDR™ DRAMs 626. Memory controller half 2 604 is connected to XIO 2 620, and XIO 2 620 is connected to XDR™ DRAMs 628. The two memory controller halves 602 and 604 and the XIOs 618 and 620 are located on the chip 630.

It is understood that the present invention can take many forms and embodiments. Accordingly, several variations of the present design may be made without departing from the scope of the invention. The capabilities outlined herein allow for the possibility of a variety of programming models. This disclosure should not be read as preferring any particular programming model, but is instead directed to the underlying concepts on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A structure of sequencers for handling differing types of initial and periodic calibrations of at least one of a plurality of memory channels for busses associated with a Dynamic Random Access Memory (DRAM) controller for memory systems, comprising:
   a first half DRAM controller;
   a second half DRAM controller identical to the first half controller;
   at least one of the controller halves interfacing at least one of the plurality of memory channels; and
   at least one of a plurality of sequencers is associated with at least one of the controller halves for handling differing types of a plurality of calibrations,
   wherein at least one of the plurality of sequencers is a current/impedance calibration sequencer;
   wherein each current/impedance calibration sequencer further comprises:
      at least one pathway that is configured to handle input/output cell current and termination calibrations;
      at least one pathway that is at least configured to handle DRAM termination impedance calibrations; and
      at least one pathway that is at least configured to handle DRAM current calibrations.

2. The structure of sequencers of claim 1, wherein at least one of the DRAM memory controller halves is configured to handle the initial and periodic calibrations of at least one of the plurality of memory channels.

3. The structure of sequencers of claim 2, wherein at least one of the plurality of memory channels further comprises at least one Input/Output Cell connected to at least one DRAM.

4. The sequencer structure of claim 1, wherein each current/impedance calibration sequencer comprises at least one counter to handle the delays associated with the initial and periodic calibrations.

5. The structure of sequencers of claim 1, wherein at least one of the plurality of sequencers is a Bank sequencer.

6. The structure of sequencers of claim 5, wherein at least one of a plurality of Bank sequencers comprises at least one of a plurality of counters to handle the delays associated with the initial and periodic calibrations.

7. A structure of sequencers for handling differing types of initial and periodic calibrations of at least one of a plurality of memory channels for busses associated with a Dynamic Random Access Memory (DRAM) controller for memory systems, comprising:

a first half DRAM controller;
a second half DRAM controller identical to the first half controller;
at least one of the controller halves interfacing at least one of the plurality of memory channels; and
at least one of a plurality of sequencers is associated with at least one of the controller halves for handling differing types of a plurality of calibrations,
wherein at least one of the plurality of sequencers is a Bank sequencer; and
wherein each Bank sequencer further comprises:
at least one pathway that is at least configured to handle receive setup, receive hold, transmit setup, and transmit hold timing calibrations;
at least one pathway that is at least configured to handle receive timing calibrations; and
at least one pathway that is at least configured to handle transmit timing calibrations.

8. The structure of sequencers of claim 7, wherein at least one of the DRAM controller halves further comprises a current/impedance calibration sequencer.

9. The structure of sequencers of claim 7, wherein at least one of the DRAM memory controller halves is configured to handle the initial and periodic calibrations of at least one of the plurality of memory channels.

10. The structure of sequencers of claim 9, wherein at least one of the plurality of memory channels further comprises at least one input/output cell connected to at least one DRAM.

11. The structure of sequencers of claim 7, wherein at least one of a plurality of Bank sequencers comprises at least one of a plurality of counters to handle the delays associated with the initial and periodic calibrations.

12. A method for handling differing types of initial and periodic calibrations of at least one of a plurality of memory channels for busses associated with a DRAM controller for memory systems, comprising:
dividing the DRAM controller into two identical halves;
interfacing at least one of the DRAM controller halves with a least one of the plurality of memory channels;
configuring at least one of the plurality of memory channels to contain at least one input/output cell connected to at least one DRAM memory cell;
housing at least one of a plurality of sequencers on at least one of the DRAM controller halves; and
configuring at least one of the plurality of sequencers to contain at least one pathway configured to handle an initial or periodic calibration of at least one of the plurality of memory channels,
wherein configuring at least one of the plurality of sequencers to contain at least one pathway configured to handle an initial or periodic calibration of at least one of the plurality of memory channels, further comprises:
configuring at least one pathway to handle input/output cell current and termination calibrations;
configuring at least one pathway to handle DRAM termination impedance calibrations; and
configuring at least one pathway to handle DRAM current calibrations.

13. The method of claim 12, wherein housing at least one of the plurality of sequencers on at least one of the DRAM controller halves, further comprises housing at least one current/impedance calibration sequencer and at least one of a plurality of Bank sequencers on at least one of the DRAM controller halves.

14. The method of claim 12, wherein configuring at least one of the plurality of sequencers to contain at least one pathway configured to handle an initial or periodic calibration of at least one of the plurality of memory channels, further comprises configuring at least one current/impedance calibration sequencer and at least one Bank sequencer to contain at least one pathway to handle at least one initial or periodic calibration.

15. A method for handling differing types of initial and periodic calibrations of at least one of a plurality of memory channels for busses associated with a DRAM controller for memory systems, comprising:
dividing the DRAM controller into two identical halves;
interfacing at least one of the DRAM controller halves with a least one of the plurality of memory channels;
configuring at least one of the plurality of memory channels to contain at least one input/output cell connected to at least one DRAM memory cell;
housing at least one of a plurality of sequencers on at least one of the DRAM controller halves; and
configuring at least one of the plurality of sequencers to contain at least one pathway configured to handle an initial or periodic calibration of at least one of the plurality of memory channels,
wherein configuring at least one of the plurality of sequencers to contain at least one pathway configured to handle an initial or periodic calibration of at least one of the plurality of memory channels, further comprises:
configuring at least one pathway to handle receive setup, receive hold, transmit setup, and transmit hold timing calibrations;
configuring at least one pathway to handle receive timing calibrations; and
configuring at least one pathway to handle transmit timing calibrations.

16. The method of claim 15, wherein housing at least one of the plurality of sequencers on at least one of the DRAM controller halves further comprises housing at least one current/impedance calibration sequencer and at least one of a plurality of Bank sequencers on at least one of the DRAM controller halves.

17. The method of claim 15, wherein configuring at least one of the plurality of sequencers to contain at least one pathway configured to handle an initial or periodic calibration of at least one of the plurality of memory channels, further comprises configuring at least one current/impedance calibration sequencer and at least one Bank sequencer to contain at least one pathway to handle at least one initial or periodic calibration.

* * * * *